United States Patent
Higuchi et al.

(10) Patent No.: US 6,702,695 B1
(45) Date of Patent: Mar. 9, 2004

(54) MULTI-PIECE SOLID GOLF BALL

(75) Inventors: Hiroshi Higuchi, Chichibu (JP); Hirotaka Shimosaka, Chichibu (JP); Yasushi Ichikawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 214 days.

(21) Appl. No.: 09/635,638

(22) Filed: Aug. 10, 2000

Related U.S. Application Data

(60) Provisional application No. 60/149,496, filed on Aug. 19, 1999.

(30) Foreign Application Priority Data

Aug. 19, 1999 (JP) ............................................. 11-232622

(51) Int. Cl.$^7$ .......................... A63B 37/12; A63B 37/14
(52) U.S. Cl. ....................................... 473/378; 473/384
(58) Field of Search ............................... 473/351, 367, 473/371, 373, 374, 376, 377, 378, 384

(56) References Cited

U.S. PATENT DOCUMENTS

| | | | | |
|---|---|---|---|---|
| 4,919,434 A | * | 4/1990 | Saito | 473/373 |
| 5,518,246 A | * | 5/1996 | Moriyama et al. | 473/384 |
| 5,704,853 A | * | 1/1998 | Maruko et al. | 473/363 |
| 5,779,562 A | * | 7/1998 | Melvin et al. | 473/373 |
| 5,779,563 A | * | 7/1998 | Yamagishi et al. | 473/371 |
| 5,971,870 A | * | 10/1999 | Sullivan et al. | 473/373 |
| 6,054,550 A | * | 4/2000 | Umezawa et al. | 528/76 |
| 6,083,120 A | * | 7/2000 | Umezawa et al. | 473/356 |
| 6,120,390 A | * | 9/2000 | Dalton | 473/351 |
| 6,152,835 A | * | 11/2000 | Sullivan et al. | 473/373 |

FOREIGN PATENT DOCUMENTS

| | | | |
|---|---|---|---|
| EP | 0 895 791 | 2/1999 | |
| EP | 0 895 792 A | 2/1999 | ........... A63B/37/00 |
| JP | 4-244174 | 9/1992 | ........... A63B/37/00 |
| JP | 6-14228 | 5/1994 | ........... A63B/37/00 |
| JP | 7-24084 | 1/1995 | ........... A63B/37/00 |
| JP | 7-24085 | 1/1995 | ........... A63B/37/00 |
| JP | 9-10358 | 1/1997 | ........... A63B/37/00 |
| JP | 11-104273 | 4/1999 | |

OTHER PUBLICATIONS

Kirk–Othmer, Concise Encyclopedia of Chemical Technology, Abridgement of the 26 vol. 3$^{rd}$ Edition copyrighted 1984, New York: John Wiley & Sons, Inc., pp. 1211–1212.*
Callister, Jr., William D., Material Science and Engineering: An Introduction, Fourth Edition. New York: John Wiley & Sons, Inc. 1997, p. 498.*
Katz, John C. and Keith F. Purcell, Chemistry and Chemical Reactivity, Second Edition, Fort Worth: Suanders College Publishing. 1991, pp. 1141 and 1142.*

* cited by examiner

Primary Examiner—Stephen Blau
Assistant Examiner—Alvin A. Hunter, Jr.
(74) Attorney, Agent, or Firm—Sughrue Mion, PLLC

(57) ABSTRACT

A multi-piece solid golf ball comprising a solid core and an enclosing cover of inner and outer layers is characterized in that the solid core has a deflection of at least 1.1 mm under an applied load of 30 kg, the cover inner layer has a Shore D hardness of 45–61, the cover outer layer has a Shore D hardness of 35–55, and the sum of dimple trajectory volumes each obtained by multiplying a dimple volume by the square root of a dimple diameter is 530–750.

32 Claims, 2 Drawing Sheets

MULTI-PIECE SOLID GOLF BALL

CROSS REFERENCE TO RELATED APPLICATION

This application is an application filed under 35 U.S.C. §111(a) claiming benefit pursuant to 35 U.S.C §119(e)(i) of the filing date of the Provisional Application No. 60/149,496 filed on Aug. 19, 1999 pursuant to 35 U.S.C. §111(b).

BACKGROUND OF THE INVENTION

1. Field of the Invention

This invention relates to multi-piece solid golf balls comprising a solid core and an enclosing cover of inner and outer layers.

2. Prior Art

At present, golf balls of various structures are known. Among others, a number of patents have been proposed relating to solid golf balls, especially multi-piece solid golf balls having a solid core enclosed with a plurality of cover layers, because of their advantages of distance, controllability or spin rate, and feel (see JP-A 4-244174, 6-142228, 7-24084, 7-24085, 9-10358, and 11-104273).

However, there is still a demand for a multi-piece solid golf ball having further improved flight performance, good spin characteristics, and a pleasant feel when hit with any of wood, iron and putter clubs, as well as improved scraping resistance and durability.

SUMMARY OF THE INVENTION

Making extensive investigations in order to meet the above demand, the inventor has found that a multi-piece solid golf ball comprising a solid core and an enclosing cover of inner and outer layers performs better when the solid core has a deflection of at least 1.1 mm under an applied load of 30 kg, the cover inner layer is formed to a Shore D hardness of 45 to 61, the cover outer layer is formed to a Shore D hardness of 35 to 55, and the sum of dimple trajectory volumes each obtained by multiplying a dimple volume by the square root of a dimple diameter is set 530 to 750.

Namely, the invention provides a multi-piece solid golf ball as defined below.

(1) A multi-piece solid golf ball comprising a solid core and a cover which encloses the solid core and consists of inner and outer layers, characterized in that the solid core has a deflection of at least 1.1 mm under an applied load of 30 kg, the cover inner layer has a Shore D hardness of 45 to 61, the cover outer layer has a Shore D hardness of 35 to 55, and the sum of dimple trajectory volumes each obtained by multiplying a dimple volume by the square root of a dimple diameter is 530 to 750.

(2) The golf ball of (1) wherein the cover inner and outer layers each are composed primarily of a thermoplastic resin.

(3) The golf ball of (1) or (2) wherein the cover outer layer is composed primarily of a thermoplastic polyurethane elastomer prepared using an aliphatic diisocyanate.

(4) The golf ball of (3) wherein the cover outer layer contains the reaction product of the thermoplastic polyurethane elastomer with an isocyanate compound as a main component.

(5) The golf ball of (1) or (2) wherein the cover outer layer is composed primarily of an ionomer resin.

(6) The golf ball of any one of (1) to (5) wherein the cover inner layer is composed primarily of an ionomer resin or a resinous component consisting of an ionomer resin and an olefin elastomer.

(7) The golf ball of any one of (1) to (5) wherein the cover inner layer is composed primarily of a thermoplastic polyester elastomer.

(8) The golf ball of any one of (1) to (7) wherein the cover outer layer is made softer than the cover inner layer.

(9) The golf ball of any one of (1) to (8) further comprising an adhesive layer between the cover inner layer and the cover outer layer.

(10) The golf ball of (9) wherein the adhesive layer is formed primarily of an urethane resin base adhesive or chlorinated polyolefin base adhesive to a thickness of 0.1 to 30 μm.

(11) The golf ball of any one of (1) to (10) wherein the solid core has a specific gravity of 1.0 to 1.3, the cover inner layer has a specific gravity of 0.8 to 1.2, and the cover outer layer has a specific gravity of 0.9 to 1.3.

(12) The golf ball of any one of (1) to (11) having a plurality of dimples wherein the elevational cross-sectional shape of the dimple at its center has an area $S_1$, multiplying the dimple diameter by a dimple depth gives an area $S_2$, the average of the dimple cross-sectional shape area ratios represented by $S_1/S_2$ is from 0.58 to 0.68, and the total number of dimples is 360 to 540.

The golf ball of the invention has an improved flight performance capability of traveling a relatively low, stretching trajectory, an increased distance, a high degree of control on iron shots, a good feel when hit with any of wood, iron and putter clubs, improved scraping resistance against control shots with an iron club, and improved durability.

DETAILED DESCRIPTION OF THE INVENTION

Figure 1:
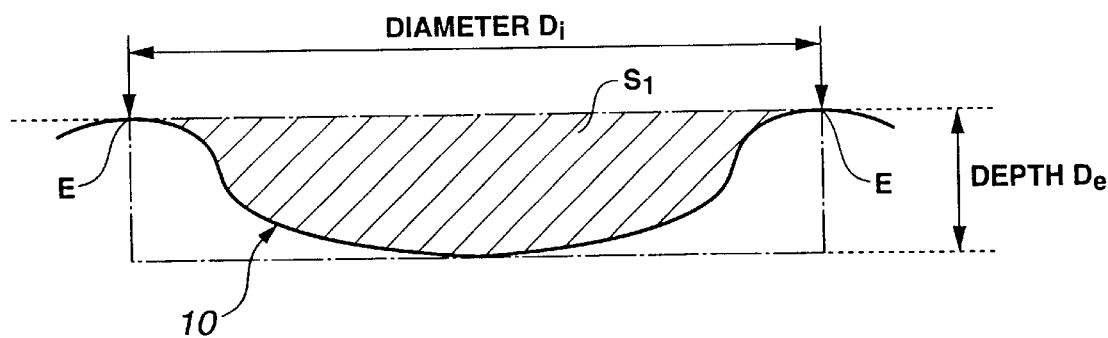
FIG. 1 is a diagram illustrating a dimple shape in the present invention.
Figure 2:
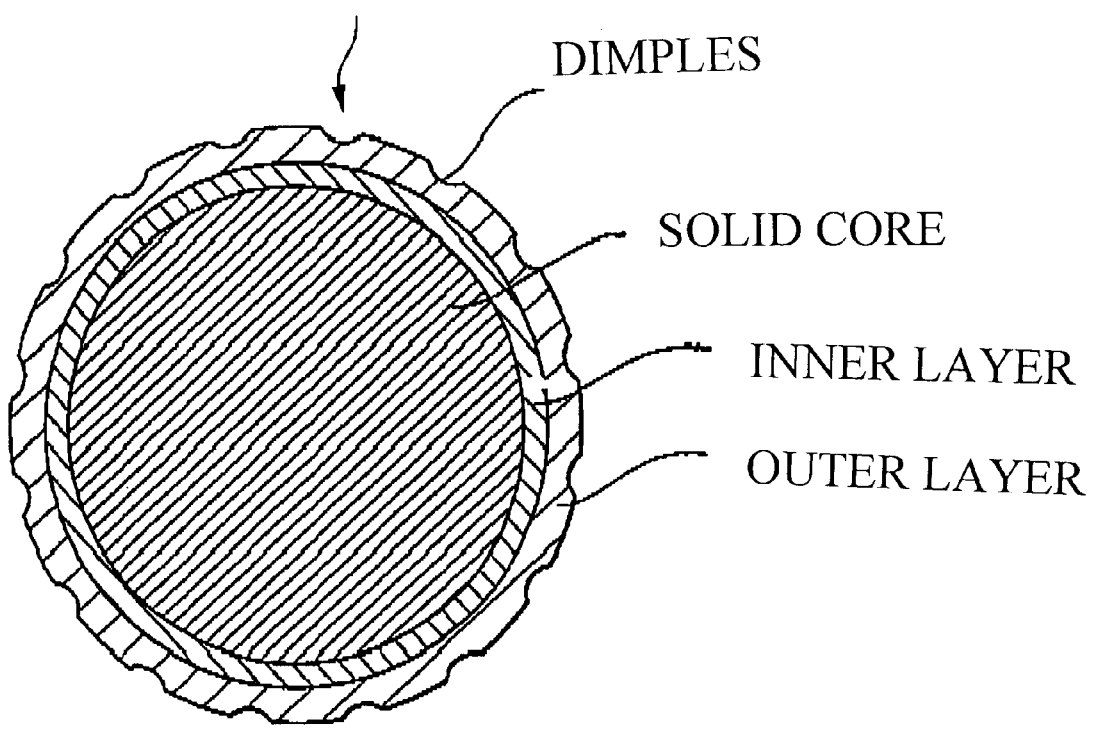

Now the present invention is described in further detail.

The multi-piece solid golf ball of the invention has a solid core and a cover of two-layer structure which encloses the solid core and consists of inner and outer layers.

The solid core is preferably formed of a rubber composition. The rubber composition used herein is preferably one using polybutadiene as the base. One preferred example of the polybutadiene is 1,4-cis-polybutadiene having at least 40% of cis structure. In the base rubber, natural rubber, polyisoprene rubber, styrene-butadiene rubber or the like may be suitably blended with the polybutadiene, if desired. By increasing the rubber component, the resilience of the golf ball is improved.

Also in the rubber composition, there may be blended a zinc or magnesium salt of an unsaturated fatty acid such as zinc methacrylate or zinc acrylate, or an ester such as trimethylpropane methacrylate as a crosslinking agent. In particular, zinc acrylate is preferably used. The amount of the crosslinking agent blended is preferably from 10 to 50 parts and especially from 20 to 45 parts by weight per 100 parts by weight of the base rubber.

In the rubber composition, a vulcanizing agent is usually blended. It is recommended that the vulcanizing agent contains a peroxide in which the temperature giving a half-life period of 1 minute is up to 155° C. The content of the peroxide is at least 30%, especially at least 40% by weight of the entire vulcanizing agent while the upper limit of the content is not critical, but is preferably up to 70% by weight. Such peroxides are commercially available, for example, under the tradename of Perhexa 3M (Nippon Oil and Fats K.K.). The amount of the vulcanizing agent blended is preferably from 0.6 to 2 parts by weight per 100 parts by weight of the base rubber.

Further, if necessary, an antioxidant and zinc oxide or barium sulfate as a filler for specific gravity adjustment may be blended.

The solid core composition obtained by blending the above-described components is manufactured into a solid core. More particularly, the components are compounded in a conventional mixer such as a Banbury mixer or a roll mill. The compound is compression or injecting molded in a core mold. The molded compound is heat cured at a sufficient temperature for the crosslinking agent and co-crosslinking agent to act, for example, at about 130 to 170° C. for 10 to 40 minutes, and especially at about 150 to 160° C. for 12 to 20 minutes when dicumyl peroxide is used as the crosslinking agent and zinc acrylate is used as the co-crosslinking agent.

The rubber composition may be vulcanized and cured by well-known techniques, producing a solid core. The solid core preferably has a diameter of at least 30 mm, more preferably at least 33 mm, especially at least 35 mm and up to 40 mm, more preferably up to 39 mm, further preferably up to 38 mm.

The solid core should have a deflection of at least 1.1 mm under an applied load of 30 kg, preferably at least 1.2 mm, more preferably at least 1.4 mm, further preferably at least 1.5 mm, and preferably up to 2.5 mm, more preferably up to 2.3 mm, further preferably up to 2.1 mm under an applied load of 30 kg. If the deflection under an applied load of 30 kg is smaller than the above-defined value, there undesirably results a hard feel. If the deflection is too large, there is a possibility of reducing resilience and durability.

Here the core in cross section preferably has such a hardness distribution that the center is softest and has a hardness (JIS C) difference of at least 5% from the hardest portion, because this contributes to a soft and pleasant feel.

Preferably the solid core has a specific gravity of 1.0 to 1.3, more preferably 1.05 to 1.25, and further preferably 1.10 to 1.20.

In the invention, the two inner and outer layers of the cover are not critical although both of them are preferably formed of thermoplastic resins. The thermoplastic resins used herein are, for example, well-known thermoplastic resins and thermoplastic elastomers. Illustrative examples are nylon, polyarylates, ionomer resins, polypropylene resins, thermoplastic polyurethane elastomers, and thermoplastic polyester elastomers. Exemplary commercially available products include Surlyn 8945 (ionomer resin by Dupont), Himilan 1706 and 1707 (ionomer resins by Dupont-Mitsui Polychemical K.K.), Rilsan BMNO (polyamide resin by Elf Atochem), and U Polymer U-8000 (polyarylate resin by Unitika K.K.).

In one preferred embodiment, the cover inner layer is formed of a composition primarily comprising an ionomer resin or a resin component consisting of an ionomer resin and an olefin elastomer.

Mixing the ionomer resin with the olefin elastomer achieves characteristics (including feel and resilience) which are not achievable when they are used alone. The olefin elastomers used herein include linear low density polyethylene, low density polyethylene, high density polyethylene, polypropylene, rubber-reinforced olefin polymers, flexomers, plastomers, thermoplastic elastomers containing acid-modified portions (styrene block copolymers and hydrogenated polybutadiene ethylene propylene rubber), dynamically vulcanized elastomers, ethylene acrylate, and ethylene vinyl acetate. Specifically, HPR available from Dupont-Mitsui Polychemical K.K. and Dynalon available from Japan Synthetic Rubber K.K. are used.

The ionomer resin and the olefin elastomer are desirably mixed in a weight ratio of from 40:60 to 95:5, preferably from 45:55 to 90:10, more preferably from 48:52 to 88:12, and especially from 55:45 to 85:15. A too small mixing proportion of the olefin elastomer may lead to a hard feel whereas a too large mixing proportion may lead to a decline of resilience.

It is noted that the ionomer resins which can be used herein are of the ion neutralized type such as Zn, Mg, Na and Li. Preferred are ionomer resins containing 5 to 100%, more preferably 10 to 80%, further preferably 15 to 70% by weight of Zn or Mg ion-neutralized type ionomer resins which are relatively soft and resilient.

In the ionomer resin, another polymer may be blended insofar as the benefits of the invention are not impaired.

The cover inner layer formed of a thermoplastic polyester elastomer is also preferable because of softness and high resilience.

The cover inner layer may contain an inorganic filler such as zinc oxide, barium sulfate or titanium dioxide in an amount of about 30% by weight or less. The preferred content of inorganic filler is 1 to 20% by weight.

Preferably the cover inner layer has a specific gravity of at least 0.8, more preferably at least 0.9, further preferably at least 0.92, most preferably at least 0.93 and up to 1.2, more preferably up to 1.16, further preferably up to 1.10, most preferably up to 1.05.

It is noted that the cover inner layer preferably has a thickness or gage of at least 0.5 mm, more preferably at least 0.9 mm, further preferably at least 1.1 mm and up to 3.0 mm, more preferably up to 2.5 mm, further preferably up to 2.0 mm.

On the other hand, the cover outer layer is preferably formed of a thermoplastic polyurethane elastomer or ionomer resin. The thermoplastic polyurethane elastomer used herein has a molecular structure consisting essentially of a high molecular weight polyol compound constituting soft segments, a monomolecular chain extender constituting hard segments, and a diisocyanate.

The high molecular weight polyol compounds used herein, though not critical, may be selected from polyester polyols, polyether polyols, copolyester polyols and polycarbonate polyols. The polyester polyols include polycaprolactone glycol, poly(ethylene-1,4-adipate) glycol, and poly(butylene-1,4-adipate) glycol; an exemplary copolyester polyol is poly(diethylene glycol adipate) glycol; an exemplary polycarbonate polyol is (hexane diol-1,6-carbonate) glycol; and an exemplary polyether polyol is polyoxytetramethylene glycol. These polyols have a number average molecular weight of about 600 to 5,000, preferably about 1,000 to 3,000.

As the diisocyanate, aliphatic diisocyanates are preferably used in consideration of the yellowing resistance of the cover. Exemplary are hexamethylene diisocyanate (HDI), 2,2,4- or 2,4,4-trimethylhexamethylene diisocyanate (TMDI), and lysine diisocyanate (LDI). HDI is especially preferable from the standpoint of compatibility in blending with other resins.

The monomolecular chain extenders used herein, though not critical, may be usual polyhydric alcohols and amines. Illustrative examples are 1,4-butylene glycol, 1,2-ethylene glycol, 1,3-propylene glycol, 1,6-hexylene glycol, 1,3-butylene glycol, dicyclohexylmethylmethane diamine (hydrogenated MDA), and isophorone diamine (IPDA).

Of the thermoplastic polyurethane elastomers, those having a tanδ peak temperature of up to −15° C., especially −16° C. to −50° C., on viscoelasticity measurement are preferably because of softness and resilience.

The thermoplastic polyurethane elastomers may be commercially available ones, for example, Pandex T7298 (−20° C.), Pandex T7295 (−26° C.), and Pandex T7890 (−30° C.) by Dainippon Ink & Chemicals K.K. wherein the diisocyanate component is aliphatic. It is noted that the temperature in parentheses is the tanδ peak temperature.

Also useful are reaction products of the above-described thermoplastic polyurethane elastomers with isocyanate compounds. They are effective for further improving the surface durability against iron shots.

Here, in addition to the thermoplastic polyurethane elastomers, other thermoplastic elastomers or polymers may be blended. For example, it is possible to blend polyamide elastomers, polyester elastomers, ionomer resins, styrene block elastomers, hydrogenated polybutadiene, and ethylene-vinyl acetate (EVA) copolymers, or add and mix hard resins such as polycarbonates and polyacrylates. The amount of the other polymer blended may be 0 to 100 parts, preferably 10 to 75 parts, further preferably 10 to 50 parts by weight per 100 parts by weight of the thermoplastic polyurethane elastomer although the amount is determined as appropriate depending on the desired hardness adjustment and improvements in resilience, flow, and adhesion to the solid core surface.

The isocyanate compound used herein may be any of the isocyanate compounds used in the prior polyurethane-related art and is not limited thereto. Examples of the aromatic isocyanate compounds are 2,4-toluene diusocyanate, 2,6-toluene diisocyanate and mixtures thereof; 4,4-diphenylmethane diisocyanate, m-phenylene diisocyanate, and 4,4'-biphenyl diisocyanate. Also useful are hydrogenated products of the above-mentioned aromatic isocyanate compounds, for example, dicyclohexylmethane diisocyanate. Further useful are aliphatic diisocyanates such as tetramethylene diisocyanate, hexamethylene diisocyanate (HDI), and octamethylene diisocyanate and alicyclic diisocyanates such as xylene diisocyanate. In particular, the aromatic isocyanate compounds are preferred.

Other examples of the isocyanate compound are blocked isocyanate compounds obtained by reacting a compound having at least two isocyanate groups at ends with a compound having active hydrogen and uretidiones obtained by dimerization of isocyanate compounds.

In preparing the blocked isocyanate compounds, the compound having at least two isocyanate groups at ends may be any of the isocyanate compounds used in the prior polyurethane-related art. Examples include aromatic diisocyanates such as 2,4-toluene diisocyanate, 2,6-toluene diisocyanate, mixtures thereof, 4,4'-diphenylmethane diisocyanate, m-phenylene diisocyanate, and 4,4'-biphenyl diisocyanate; aliphatic diisocyanates such as tetramethylene diisocyanate, hexamethylene diisocyanate, and octamethylene diisocyanate; alicyclic diisocyanates such as xylene diisocyanate; and triisocyanates such as 4,4',4"-triphenylmethane triisocyanate, 2,4,4'-biphenyl triisocyanate, and 2,4,4'-diphenylmethane triisocyanate.

Although the isocyanate compound used herein is not critical, it is preferable in the practice of the invention to use 2,4-toluene diisocyanate, 2,6-toluene diisocyanate, and mixtures thereof.

The compounds having active hydrogen may be any of the compounds which are conventionally used as the agent for blocking isocyanate groups. For example, alcohols, phenols, epsilon-caprolactam, oximes, and active methylene compounds are effective. In particular, phenols such as phenol and xylenol are effective in the practice of the invention.

In preparing the blocked isocyanate compound by reacting the two components described above, well-known methods may be used and the method is not particularly limited. For example, in the case of a diisocyanate compound having isocyanate groups with different reactivity as typified by 2,4-toluene diisocyanate, a method of previously forming a half-blocked product and then converting it into a polyisocyanate prepolymer is advantageously used because the higher reactivity isocyanate group can be regenerated as a blocked isocyanate for use in crosslinking. One example of this method involves adding dropwise 3 mol of 2-ethylhexanol to 3 mol of 2,4-toluene diisocyanate, keeping the mixture at 50° C. for 2 hours to form a half-blocked product, adding 5 g of potassium octylate thereto to drive isocyanate conversion, adding 500 g of cellosolve acetate thereto, and keeping the mixture at 105° C. for 2 hours, thereby blocking about 98% of isocyanate groups.

The blocked isocyanate compound thus obtained is stable as a carbamic acid compound lacking isocyanate groups which can liberate at room temperature. Upon heating, the isocyanate is dissociated and activated.

Commercially available products are advantageously used as the blocked isocyanate compound described above. For example, Colonate AP Staple, Colonate 2503, and Colonate 2507 are blocked isocyanate compounds commercially available from Nippon Polyurethane Industry K.K.

With respect to the uretidiones obtained by dimerization of isocyanate compounds, the isocyanate compounds having at least two isocyanate groups are preferably aromatic isocyanate compounds such as 2,4-toluene diisocyanate, 2,6-toluene diisocyanate and mixtures thereof, and 4,4'-diphenylmethane diisocyanate. The dimerization of TDI, for example, can be carried out by heating in the presence of catalysts such as trialkylphosphines and dialkylphosphines. The resulting dimer dissociates above about 120° C. into free TDI, which undertakes allophanate crosslinking when heated together with an active hydrogen-containing compound.

Commercially available products are advantageously used as the uretidione. For example, Desmodur TT is a TDI dimer commercially available from Bayer-Sumitomo K.K.

The amount of the isocyanate compound blended may be 0.1 to 10 parts, preferably 0.2 to 5 parts, further preferably 0.3 to 3 parts by weight per 100 parts by weight of the thermoplastic polyurethane elastomer. Less than 0.1 part by weight of the isocyanate compound may fail to achieve sufficient crosslinking reaction and improve physical properties whereas more than 10 parts by weight may cause problems such as substantial discoloration, a loss of thermoplasticity and a decline of resilience with time or under heat or ultraviolet radiation.

The rate and temperature of dissociation reaction of the isocyanate compound can be controlled using a catalyst. The catalyst which can be used for this purpose may be any of the catalysts generally used in urethane reaction, for example, tin compounds such as 1,3-diacetoxytetrabutyl-stannoxane, organic acid salts of metals other than tin such as 2-ethylhexyl titanate, common inorganic metal salts such as stannic chloride, and tertiary amines such as N-methylmorpholine. The amount of the catalyst used is preferably 0.01 to 3 parts, especially 0.05 to 2 parts by weight per 100 parts by weight of the thermoplastic polyurethane elastomer.

As previously described, the cover outer layer may also be formed of an ionomer resin. The outer layer may be formed primarily of any of the ionomer resins generally used as the cover stock of solid golf balls. Illustrative ionomer resins are Himilan 1605 and 1706 (Dupont-Mitsui Polychemical K.K.) and Surlyn 8120 and 8320 (E. I. Dupont).

Two or more ionomer resins may be used in combination. If necessary, the ionomer resin may be compounded with well-known additives such as pigments, dispersants, antioxidants, UV absorbers, UV stabilizers, and plasticizers. The cover outer layer may contain an inorganic filler such as zinc oxide, barium sulfate or titanium dioxide in an amount of 1 to 30% by weight, and especially 1.5 to 20% by weight.

The cover outer layer preferably has a specific gravity of 0.90 to 1.30, more preferably 0.95 to 1.25, and further preferably 1.0 to 1.22.

The cover outer layer preferably has a thickness or gage of 0.5 to 2.5 mm, more preferably 0.9 to 2.3 mm, and further preferably 1.1 to 2.0 mm.

The thickness of the cover inner layer and cover outer layer combined, that is, the overall thickness of the cover is preferably 1.0 to 5.5 mm, more preferably 1.5 to 4.5 mm, and further preferably 2.0 to 3.5 mm.

According to the invention, the cover inner layer has a Shore D hardness of at least 45, preferably at least 47, more preferably at least 50, further preferably at least 52, most preferably at least 54 and up to 61, preferably up to 60, more preferably up to 59, further preferably up to 58, most preferably up to 57. Too soft a cover inner layer leads to a decline of resilience whereas too hard a cover inner layer leads to a hard feel.

On the other hand, the cover outer layer has a Shore D hardness of at least 35, preferably at least 38, more preferably at least 40, further preferably at least 42 and up to 55, preferably up to 53, more preferably up to 52, further preferably up to 50. Too soft a cover outer layer leads to an excessive spin receptivity, a decline of resilience and a shorter distance. Inversely, too hard a cover outer layer leads to a hard feel and lower spin performance. Here, the hardness of the cover outer layer is preferably lower than the hardness of the cover inner layer.

For the purpose of improving the durability against strikes, an adhesive layer may be disposed between the cover inner layer and the cover outer layer. The adhesives which can be used herein may be epoxy resin base adhesives, vinyl resin base adhesives and rubber base adhesives although the use of urethane resin base adhesives and chlorinated polyolefin base adhesives is especially preferred.

The adhesive layer may be formed by dispersion coating. No limit is imposed on the type of emulsion used in dispersion coating. The resin powder used in preparing the emulsion may be either thermoplastic resin powder or thermosetting resin powder. For example, vinyl acetate resins, vinyl acetate copolymer resins, ethylene-vinyl acetate (EVA) copolymer resins, acrylic ester (co)polymer resins, epoxy resins, thermosetting urethane resins, and thermoplastic urethane resins may be used. Of these resins, epoxy resins, thermosetting urethane resins, thermoplastic urethane resins, and acrylic ester (co)polymer resins are preferred, with the thermosetting urethane resins being especially preferred.

The adhesive layer preferably has a thickness of 0.1 to 30 $\mu$m, more preferably 0.2 to 25 $\mu$m, and most preferably 0.3 to 20 $\mu$m.

According to the invention, the cover outer layer is formed with a plurality of dimples. The sum of dimple trajectory volumes each obtained by multiplying a dimple volume by the square root of a dimple diameter should be 530 to 750.

The most requisite characteristic for golf balls is a long flight distance. When run is taken into account, golf balls traveling a low trajectory are mostly advantageous with respect to the total flight distance. Analyzing numerous data, the inventor has discovered that the sum of dimple trajectory volumes each obtained by multiplying a dimple volume by the square root of a dimple diameter (or totaldimple trajectory volume) governs the angle of elevation of a ball when hit at a high head speed. By adjusting the total dimple trajectory volume to an optimum value, the variation in flight performance of the ball can be minimized. Additionally, by adjusting the dimple cross-sectional shape area ratio to be defined later to an optimum value, low trajectory-producing dimples ensuring a stretching flight in that the carry can be further extended even at the same angle of elevation are developed.

More particularly, the golf ball of the invention has a plurality of dimples such that the sum of dimple trajectory volumes VT each obtained by multiplying a dimple volume by the square root of a dimple diameter (total dimple trajectory volume TVT) is 530 to 750. Here the lower limit of TVT is at least 530, preferably at least 550, more preferably at least 580, and further preferably at least 600 and the upper limit is up to 750, preferably up to 730, more preferably up to 700, and further preferably up to 670.

According to the invention, in an elevational cross section taken at the center of a dimple 10 as shown in FIG. 1 wherein the left and right highest points in the figure are positioned on a horizontal line and these highest points are designated dimple edges E and E, the dimple 10 has a diameter Di which is equal to the distance between the dimple edges E and E. The dimple 10 has a depth De which is equal to the distance from a line segment connecting the edges E and E to the deepest bottom of the dimple. Then the dimple has a volume V which is the volume of a dimple portion circumscribed by the edges. The elevational cross-sectional shape of the dimple has an area S, which is given by the hatched portion in FIG. 1.

Specifically, the TVT defined herein is the sum of VT $(=V \times Di^{0.5})$ of dimples. From the value of TVT, the approximate trajectory height of a ball when hit at a high head speed, especially about 50 m/s is determinable. In general, smaller values of TVT lead to greater elevation angles while larger values of TVT lead to less elevation angles. The present invention sets TVT in the range of 530 to 750 as described above. Too small values of TVT lead to a too higher trajectory and hence, an unsatisfactory run and a decline of total flight distance. Inversely, too large values of TVT lead to a too lower trajectory and hence, a short carry and a decline of flight distance. Additionally, outside the range of TVT defined by the invention, variations of carry become greater. In either case, the stability of performance is lost.

Preferably, when the golf ball of the invention is hit with a driver having a loft angle of 7.50° at a head speed of 50 m/s, the ball launches at an elevation angle of at least 8.60, especially at least 8.70, and up to 9.30, more desirably up to 9.20, further desirably up to 9.10, most desirably up to 9.00.

In one preferred embodiment of the invention, provided that the elevational cross-sectional shape of the dimple at its center has an area $S_1$, and multiplying the dimple diameter Di by the dimple depth De gives an area $S_2$, the average SA of the dimple cross-sectional shape area ratio So represented by $S_1/S_2$ is 0.58 to 0.68, and at least 80% of the entire dimples have a dimple cross-sectional shape area ratio $S_0$ of from 0.58 to 0.68.

Here, $S_1$, Di, and De are as defined above. $S_2$ is the area of a rectangle delimited by dot-and-dash lines in FIG. 1. SA is the sum of $S_0$ of all the dimples divided by the number of dimples n.

In the practice of the invention, it is preferred that SA is at least 0.58, more preferably at least 0.60, further preferably at least 0.62 and up to 0.68, more preferably up to 0.67, further preferably up to 0.66. Too smaller values of SA are likely to provide a run-disturbing trajectory whereas too larger values of SA are likely to provide a carry-disturbing trajectory.

Also preferably, at least 80%, more preferably at least 88%, further preferably at least 94% of the entire dimples have a So in the range between 0.58 and 0.68. Even with SA within the above-defined range, if at least 80% of the entire dimples do not have a $S_0$ in the above-defined range, there would occur the disadvantages that both carry and run are short.

It is noted that the shape of dimples used herein is generally circular in plane. Preferably the dimples have a diameter of at least 1.8 mm, more preferably at least 2.4 mm, further preferably at least 3.0 mm and up to 4.6 mm, more preferably up to 4.4 mm, further preferably up to 4.2 mm. Preferably the dimples have a depth of at least 0.08 mm, more preferably at least 0.10 mm, further preferably at least 0.12 mm and up to 0.22 mm, more preferably up to 0.20 mm, further preferably up to 0.19 mm.

The total number of dimples (n) is from 360 to 540. More preferably, the total number of dimples is at least 370, further preferably at least 380 and at most 500, further preferably at most 450. Preferred for the dimples used herein are combinations of dimples of at least two types, more preferably at least three types, further preferably at least four types, which are different in diameter, and up to six types, especially up to five types which are different in diameter. These dimples may also be different in depth. Therefore, combinations of dimples of at least three types and up to ten types, especially up to eight types which are different in VT are preferable.

For the arrangement of the above-described dimples, any well-known technique may be used, and no particular limit is imposed as long as the dimples are evenly distributed. There may be employed any of the octahedral arrangement, icosahedral arrangement, and sphere division techniques of equally dividing a hemisphere into 2 to 6 regions wherein dimples are distributed in the divided regions. Fine adjustments or modifications may be made on these techniques. It is also preferred herein that the dimple surface coverage is 69 to 82%, especially 72 to 77%.

The golf ball of the invention is generally completed as a product by further coating the cover with a paint. It is preferable that the golf ball of the invention experience a compression deformation (referred to as $\mu$ hardness, hereinafter) of 2.0 to 4.0 mm, more preferably 2.2 to 3.7 mm, further preferably 2.5 to 3.5 mm, when the load which varies from an initial load of 10 kg to a final load of 130 kg is applied to the ball. Too low a $\mu$ hardness is likely to invite a harder feel, whereas too high a $\mu$ hardness would detract from durability and resilience.

The diameter and weight of the golf ball of the invention comply with the Rules of Golf. The ball is preferably formed to a diameter of at least 42.67 mm and up to 44.00 mm, more preferably up to 43.50 mm, further preferably up to 43.00 mm. The weight is preferably up to 45.92 g and at least 44.5 g, more preferably at least 44.8 g, further preferably at least 45.0 g, most preferably at least 45.1 g.

The multi-piece solid golf ball of the invention features an increased distance, ease of control, a pleasant feel, and improved durability.

EXAMPLE

Examples and Comparative Examples are given below for illustrating the invention, but the invention is not limited to the following Examples.

Examples & Comparative Examples

Three-piece solid golf balls shown in Tables 6 and 7 were conventionally manufactured by successively forming on the solid core shown in Tables 1 and 2 the cover inner layer shown in Table 3 and the cover outer layer shown in Table 4 while uniformly distributing the dimples shown in Table 5.

A flight test was carried out on the thus obtained golf balls by the following procedure. The balls were also examined for spin rate, feel, scraping resistance and durability against consecutive strikes. The results are also shown in Tables 6 and 7.

Flight Test

Using a swing robot manufactured by Miyamae K.K., 20 balls of each Example were hit with a driver at a head speed (HS) of 50 m/s. An elevation angle (angle in height direction relative to the horizontal), carry and total distance were measured.

Club Used

Head: manufactured by Bridgestone Sports Co., Ltd., J's METAL, loft angle 7.5°, lie angle 57°, SUS630 stainless steel, lost wax process Shaft: Harmotech Pro, HM-70, LK (low kick point), hardness X Spin The spin rate was calculated by hitting the ball with a driver (#W1) or a sand wedge (#SW) at a head speed (HS) of 20 m/s, photographing the behavior of the ball immediately after the impact, and carrying out image analysis.

Feel

Three professional golfers actually hit the ball with #W1 or a putter (#PT) and rated the feel according to the following criteria.

◯: soft

Δ: somewhat hard x: hard

Scraping Resistance

The ball was hit at two arbitrary points with a sand wedge (#SW) at a head speed of 38 m/s using a swing robot, and visually observed and rated.

◎: very good

◯: good

Δ: ordinary x: poor

Durability Against Consecutive Strikes

The ball was consecutively hit at a head speed of 38 nm/s using a flywheel hitting machine, and rated in terms of the number of hits until the ball failed ○: good
Δ: ordinary
x: poor

TABLE 1

Core formulation

| Solid core composition (pbw) | Example | | | | | | | |
|---|---|---|---|---|---|---|---|---|
| | 1 | 2 | 3 | 4 | 5 | 6 | 7 | 8 |
| Polybutadiene | 100 | 100 | 100 | 100 | 100 | 100 | 100 | 100 |
| Dicumyl peroxide | 1.2 | 1.2 | 1.2 | 1.2 | 1.2 | 1.2 | 1.2 | 1.2 |
| Peroxide (Luperco 101XL) | — | — | — | — | — | — | — | — |
| Barium sulfate | 13.4 | 12.7 | 13.1 | 11.5 | 11.0 | 3.6 | 19.4 | 13.3 |
| Zinc white | 5 | 5 | 5 | 5 | 5 | 5 | 5 | 5 |
| Antioxidant | 0.2 | 0.2 | 0.2 | 0.2 | 0.2 | 0.2 | 0.2 | 0.2 |
| Liquid monomer SR-351 (TMPTA)* | — | — | — | — | — | — | — | — |
| Zinc salt of pentachlorothiophenol | 1 | 1 | 1 | 1 | 1 | 1 | 1 | 1 |
| Zinc diacrylate | 27.4 | 25.9 | 27.4 | 29.6 | 29.6 | 27.4 | 29.6 | 29.6 |

*Liquid monomer SR-351: trimethylolpropane triacrylate (Sartomer Co.)

TABLE 2

Core formulation

| Solid core composition (pbw) | Comparative Example | | | | | | | | | |
|---|---|---|---|---|---|---|---|---|---|---|
| | 1 | 2 | 3 | 4 | 5 | 6 | 7 | 8 | 9 | 10 |
| Polybutadiene | 100 | 100 | 100 | 100 | 100 | 100 | 100 | 100 | 100 | 100 |
| Dicumyl peroxide | 1.2 | 1.2 | 1.2 | — | — | 1.2 | 1.2 | 1.2 | 1.2 | 1.2 |
| Peroxide (Luperco 101XL) | — | — | — | 0.8 | 1.2 | — | — | — | — | — |
| Barium sulfate | — | 18.9 | 52.6 | — | — | 12.8 | 23.6 | 1.2 | 12.3 | 9.8 |
| Zinc white | 3.8 | 5 | 5 | 35 | 18.5 | 5 | 5 | 5 | 5 | 5 |
| Antioxidant | 0.2 | 0.2 | 0.2 | 0.8 | 0.5 | 0.2 | 0.2 | 0.2 | 0.2 | 0.2 |
| Liquid monomer SR-351 (TMPTA)* | — | — | — | 5 | — | — | — | — | — | — |
| Zinc salt of pentachlorothiophenol | 1 | 1 | 1 | — | — | 1 | 1 | 1 | 1 | 1 |
| Zinc diacrylate | 39.2 | 33.3 | 18.5 | 12.2 | 25.0 | 34.0 | 27.4 | 34.8 | 29.6 | 31.8 |

*Liquid monomer SR-351: trimethylolpropane triacrylate (Sartomer Co.)

TABLE 3

Cover inner layer

| Components (pbw) | ion | a | b | c | d | e | f | g | h | i | j | k |
|---|---|---|---|---|---|---|---|---|---|---|---|---|
| Dynalon 6100P | | 30 | — | 30 | — | — | 48 | — | — | — | — | — |
| Nuclel AN4311 | | 25 | — | — | — | — | — | — | — | — | — | — |
| Hytrel 4047 | | — | — | — | — | — | — | 100 | — | — | — | — |
| Hytrel 4701 | | — | — | — | — | 100 | — | — | — | — | — | — |
| PEBAX 3533 | | — | — | — | — | — | — | — | 100 | — | — | — |
| Surlyn 9945 | Zn | — | — | 35 | — | — | 26 | — | — | — | — | — |
| Surlyn 8945 | Na | — | — | 35 | — | — | 26 | — | — | — | — | — |
| Surlyn 8120 | Na | — | — | — | 20 | — | — | — | — | — | — | — |
| Surlyn 7930 | Li | 22.5 | — | — | — | — | — | — | — | — | — | — |
| Surlyn 8940 | Na | — | — | — | — | — | — | — | — | — | 75 | — |
| Surlyn 9910 | Zn | — | — | — | — | — | — | — | — | — | 25 | — |
| Himilan AM7311 | Mg | 22.5 | — | — | — | — | — | — | — | — | — | — |
| Himilan 1557 | Zn | — | 50 | — | 35 | — | — | — | — | — | — | — |
| Himilan 1605 | Na | — | 50 | — | 30 | — | — | — | — | 50 | — | — |
| Himilan 1706 | Zn | — | — | — | — | — | — | — | — | 50 | — | — |
| Himilan 1855 | Zn | — | — | — | 15 | — | — | — | — | — | — | — |
| Titanium dioxide | | 4.5 | 2.4 | 5.1 | 5.1 | — | 5.1 | — | — | 5.1 | — | — |
| Polybutadiene* | | — | — | — | — | — | — | — | — | — | — | 100 |
| Zinc diacrylate | | — | — | — | — | — | — | — | — | — | — | 40 |
| Zinc white | | — | — | — | — | — | — | — | — | — | — | 12.5 |
| Antioxidant** | | — | — | — | — | — | — | — | — | — | — | 0.5 |

TABLE 3-continued

| | Cover inner layer | | | | | | | | | | |
|---|---|---|---|---|---|---|---|---|---|---|---|
| Components (pbw) ion | a | b | c | d | e | f | g | h | i | j | k |
| Dicumyl peroxide | — | — | — | — | — | — | — | — | — | — | 1.5 |
| Vulcanizing conditions (° C. × min) | — | — | — | — | — | — | — | — | — | — | 160 × 20 |

*Polybutadiene: JSR BR11 by Japan Synthetic Rubber K.K.
**Antioxidant: Yoshinox 425 by Yoshitomi Pharmaceuticals K.K.

TABLE 4

| | Cover outer layer | | | | | | | | | |
|---|---|---|---|---|---|---|---|---|---|---|
| Components (pbw) | A | B | C | D | E | F | G | H | I | J |
| Pandex T7890 | — | 100 | — | — | — | — | — | — | — | — |
| Pandex TR3080 | 30 | — | 50 | — | — | — | — | — | — | — |
| Pandex T7298 | 70 | — | 50 | 100 | — | — | — | — | — | — |
| Nuclel AN4212C | — | — | — | — | 30 | — | — | — | — | — |
| Surlyn 8120 | — | — | — | — | — | 100 | 50 | — | 60 | — |
| Himilan 1605 | — | — | — | — | 20 | — | — | — | — | — |
| Himilan 1650 | — | — | — | — | — | — | 50 | — | — | — |
| Himilan 1706 | — | — | — | — | 20 | — | — | — | 40 | — |
| Himilan 1855 | — | — | — | — | 30 | — | — | — | — | 50 |
| Himilan 1856 | — | — | — | — | — | — | — | — | — | 50 |
| Titanium dioxide | 2.7 | 2.7 | 2.7 | 2.7 | 4 | 5.1 | 5.1 | — | 5.1 | 5.1 |
| Diphenylmethane diisocyanate* | — | — | — | 1 | — | — | — | — | — | — |
| Dicyclohexylmethane diisocyanate** | — | — | 1.5 | — | — | — | — | — | — | — |
| Transpolyisoprene (TP-301) | — | — | — | — | — | — | — | 60 | — | — |
| Polybutadiene | — | — | — | — | — | — | — | 40 | — | — |
| Zinc oxide | — | — | — | — | — | — | — | 5 | — | — |
| TiO$_2$ | — | — | — | — | — | — | — | 17 | — | — |
| Ultramarine Blue Color | — | — | — | — | — | — | — | 0.5 | — | — |
| Zinc diacrylate | — | — | — | — | — | — | — | 35 | — | — |
| Peroxide (Varox 230XL) | — | — | — | — | — | — | — | 2.5 | — | — |
| Vulcanizing conditions (° C. × min) | — | — | — | — | — | — | — | 150 × 8 | — | — |

*Diphenylmethane diisocyanate: Nippon Polyurethane Industry K.K.
**Dicyclohexylmethane diisocyanate: Bayer-Sumitomo Urethane Industry K.K.

Note:
1. Dynalon: Japan Synthetic Rubber K.K., block copolymer, hydrogenated butadiene-styrene copolymer
2. Nuclel: Dupont-Mitsui Polychemical K.K., ethylene-methacrylic acid-acrylate terpolymer
3. Hytrel: Dupont-Toray K.K., thermoplastic polyester elastomer
4. PEBAX: Elf Atochem, polyamide elastomer
5. Surlyn: Dupont, ionomer resin
6. Himilan: Dupont-Mitsui Polychemical K.K., ionomer-resin
7. PANDEX: Dainippon Ink & Chemicals K.K., thermoplastic polyurethane elastomer

TABLE 5

| | | ① Example 1, 2, 3, 7 | ② Example 4, 5 | ③ Example 6, 8 | ④ Comparative Example 1 | ⑤ Comparative Example 2 | ⑥ Comparative Example 3, 4, 9 | ⑦ Comparative Example 5, 6 | ⑧ Comparative Example 7, 10 | ⑨ Comparative Example 8 |
|---|---|---|---|---|---|---|---|---|---|---|
| Dimple (1) | Dimple number | 72 | 72 | 72 | 54 | 72 | 150 | 156 | 72 | 288 |
| | Diameter (mm) | 4.10 | 4.08 | 4.08 | 4.10 | 4.04 | 3.65 | 4.03 | 4.00 | 3.85 |
| | Depth (mm) | 0.16 | 0.16 | 0.18 | 0.21 | 0.18 | 0.15 | 0.15 | 0.20 | 0.18 |
| Dimple (2) | Dimple number | 200 | 200 | 200 | 174 | 200 | 210 | 204 | 200 | 72 |
| | Diameter (mm) | 3.95 | 3.92 | 3.98 | 3.85 | 3.94 | 3.50 | 3.64 | 3.85 | 3.25 |
| | Depth (mm) | 0.15 | 0.15 | 0.17 | 0.21 | 0.17 | 0.15 | 0.14 | 0.19 | 0.17 |
| Dimple (3) | Dimple number | 120 | 120 | 120 | 132 | 120 | — | 60 | 120 | 42 |
| | Diameter (mm) | 3.14 | 3.14 | 3.18 | 3.40 | 3.10 | — | 2.49 | 3.40 | 2.50 |
| | Depth (mm) | 0.13 | 0.13 | 0.13 | 0.21 | 0.14 | — | 0.10 | 0.17 | 0.17 |
| Total dimple number | | 392 | 392 | 392 | 360 | 392 | 360 | 420 | 392 | 402 |
| Average SA | | 0.65 | 0.65 | 0.65 | 0.67 | 0.57 | 0.63 | 0.64 | 0.67 | 0.69 |
| Total dimple trajectory volume TVT (mm$^{3.5}$) | | 615.4 | 598.0 | 694.3 | 854.5 | 540.3 | 513.4 | 602.3 | 839.9 | 800.3 |

TABLE 6

|  |  | EX 1 | EX 2 | EX 3 | EX 4 | EX 5 | EX 6 | EX 7 | EX 8 |
|---|---|---|---|---|---|---|---|---|---|
| Core | Diameter (mm) | 36.6 | 36.0 | 36.4 | 36.6 | 36.6 | 37.0 | 37.6 | 36.5 |
|  | deflection under 30-kg load (mm) | 1.91 | 2.02 | 1.91 | 1.74 | 1.74 | 1.91 | 1.74 | 1.74 |
|  | Specific gravity | 1.15 | 1.15 | 1.15 | 1.15 | 1.15 | 1.10 | 1.19 | 1.16 |
| Cover inner layer | Type | a | b | c | c | d | e | f | e |
|  | Shore D hardness | 51 | 60 | 56 | 56 | 58 | 47 | 51 | 47 |
|  | Specific gravity | 0.95 | 0.97 | 0.96 | 0.96 | 0.97 | 1.15 | 0.95 | 1.15 |
|  | Gage (mm) | 1.60 | 1.55 | 1.65 | 1.55 | 1.55 | 1.45 | 1.35 | 1.60 |
| Adhesive layer |  | applied | applied | applied | applied | applied | applied | no | no |
| Cover outer layer | Type | A | B | C | D | A | C | E | E |
|  | Specific gravity | 1.18 | 1.18 | 1.18 | 1.18 | 1.18 | 1.18 | 0.98 | 0.98 |
|  | Gage (mm) | 1.45 | 1.80 | 1.50 | 1.50 | 1.50 | 1.40 | 1.20 | 1.50 |
|  | Shore D hardness | 47 | 42 | 45 | 50 | 47 | 45 | 49 | 49 |
| Ball | Weight (g) | 45.30 | 45.30 | 45.30 | 45.30 | 45.30 | 45.30 | 45.30 | 45.30 |
|  | Diameter (mm) | 42.70 | 42.70 | 42.70 | 42.70 | 42.70 | 42.70 | 42.70 | 42.70 |
| Dimple | Type | ① | ① | ① | ② | ② | ③ | ① | ③ |
| #W1 HS50 | Carry (m) | 226.5 | 227.0 | 227.0 | 231.5 | 231.0 | 225.5 | 225.5 | 225.0 |
|  | Total (m) | 256.0 | 257.5 | 257.0 | 259.0 | 258.0 | 256.5 | 255.5 | 256.0 |
|  | Spin (rpm) | 3135 | 3110 | 3123 | 3061 | 3098 | 3214 | 3130 | 3171 |
|  | Feel | ○ | ○ | ○ | ○ | ○ | ○ | ○ | ○ |
|  | Trajectory | low, stretching trajectory | low, stretching trajectory | low, stretching trajectory | somewhat high, but stretching trajectory | somewhat high, but stretching trajectory | low, somewhat rising, stretching trajectory | low, stretching trajectory | low, somewhat rising, stretching trajectory |
| #SW HS20 PT | Spin (rpm) | 6302 | 6361 | 6275 | 6095 | 6285 | 6328 | 6212 | 6229 |
|  | Feel | ○ | ○ | ○ | ○ | ○ | ○ | ○ | ○ |
| Scraping resistance |  | ○ | ○ | ⊙ | ⊙ | ○ | ○ | ○ | ○ |
| Durability against consecutive strikes |  | ○ | ○ | ○ | ○ | ○ | ○ | ○ | ○ |

TABLE 7

|  |  | CE 1 | CE 2 | CE 3 | CE 4 | CE 5 | CE 6 | CE 7 | CE 8 | CE 9 | CE 10 |
|---|---|---|---|---|---|---|---|---|---|---|---|
| Core | Diameter (mm) | 35.5 | 36.4 | 31.5 | 38.1 | 34.9 | 36.5 | 36.5 | 36.7 | 36.6 | 35.5 |
|  | deflection under 30-kg load (mm) | 1.01 | 1.46 | 2.58 | 1.74 | 2.02 | 1.40 | 1.91 | 1.35 | 1.74 | 1.57 |
|  | Specific gravity | 1.10 | 1.20 | 1.35 | 1.18 | 1.16 | 1.17 | 1.21 | 1.11 | 1.15 | 1.15 |
| Cover inner layer | Type | g | h | i | j | k | g | b | g | f | i |
|  | Shore D hardness | 40 | 42 | 62 | 60 | 69 | 40 | 60 | 40 | 51 | 62 |
|  | Specific gravity | 1.12 | 1.01 | 0.98 | 0.98 | 1.15 | 1.12 | 0.97 | 1.12 | 0.95 | 0.98 |
|  | Gage (mm) | 1.63 | 1.80 | 3.40 | 0.95 | 2.50 | 1.60 | 1.60 | 1.50 | 1.60 | 1.63 |
| Adhesive layer |  | applied | no | no | no | no | no | no | applied | no | no |
| Cover outer layer | Type | C | F | G | H | E | I | J | B | D | D |
|  | Specific gravity | 1.18 | 0.98 | 0.98 | 0.98 | 0.98 | 0.98 | 0.98 | 1.18 | 1.18 | 1.18 |
|  | Gage (mm) | 1.98 | 1.35 | 2.20 | 1.33 | 1.40 | 1.50 | 1.50 | 1.50 | 1.45 | 1.98 |
|  | Shore D hardness | 45 | 45 | 55 | 45 | 49 | 53 | 55 | 42 | 50 | 50 |
| Ball | Weight (g) | 45.30 | 45.30 | 45.30 | 45.30 | 45.30 | 45.30 | 45.30 | 45.30 | 45.30 | 45.30 |
|  | Diameter (mm) | 42.70 | 42.70 | 42.70 | 42.67 | 42.70 | 42.70 | 42.70 | 42.70 | 42.70 | 42.70 |
| Dimple | Type | ④ | ⑤ | ⑥ | ⑥ | ⑦ | ⑦ | ⑧ | ⑨ | ⑥ | ⑧ |
| #W1 HS50 | Carry (m) | 215.5 | 225.5 | 226.5 | 226.0 | 213.0 | 223.0 | 214.0 | 218.0 | 226.5 | 215.0 |
|  | Total (m) | 250.0 | 251.5 | 252.0 | 250.5 | 250.5 | 249.5 | 250.0 | 251.0 | 251.0 | 250.0 |
|  | Spin (rpm) | 3448 | 3360 | 2699 | 3125 | 2888 | 3420 | 2885 | 3442 | 3112 | 3050 |
|  | Feel | x | Δ | x | Δ | ○ | Δ | ○ | ○ | ○ | Δ |

TABLE 7-continued

|  |  | CE 1 | CE 2 | CE 3 | CE 4 | CE 5 | CE 6 | CE 7 | CE 8 | CE 9 | CE 10 |
|---|---|---|---|---|---|---|---|---|---|---|---|
|  | Trajectory | too low, dropping trajectory | somewhat high, skying trajectory | too high, stalling trajectory | high, skying trajectory | low, dropping trajectory | low launching, skying trajectory | too low, dropping trajectory | too low, dropping trajectory | high, skying trajectory | too low, dropping trajectory |
| #SW HS20 | Spin (rpm) | 6352 | 6348 | 5865 | 6152 | 6086 | 6211 | 5903 | 6304 | 6111 | 6089 |
| PT | Feel | ○ | ○ | x | ○ | x | ○ | ○ | ○ | ○ | x |
| Scraping resistance |  | Δ | Δ | x | x | x | Δ | ○ | ○ | ○ | x |
| Durability against consecutive strikes |  | ○ | ○ | Δ | x | x | ○ | ○ | ○ | ○ | x |

What is claimed is:

1. A multi-piece solid golf ball comprising a solid core and a cover which encloses the solid core and includes inner and outer layers, wherein said solid core has a deflection of at least 1.1 mm under an applied load of 30 kg, said cover inner layer has a Shore D hardness of 45 to 59, said cover outer layer has a Shore D hardness of 35 to 55, and the sum of dimple trajectory volumes each obtained by multiplying a dimple volume by the square root of a dimple diameter is 530 to 750.

2. The golf ball of claim 1 wherein said cover inner and outer layers each are composed primarily of a thermoplastic resin.

3. The golf ball of claim 1 wherein said cover outer layer is composed primarily of a thermoplastic polyurethane elastomer prepared using an aliphatic diisocyanate.

4. The golf ball of claim 1 wherein said cover outer layer is composed primarily of an ionomer resin.

5. The golf ball of claim 1 wherein said cover inner layer is composed primarily of one of an ionomer resin and a resinous component consisting of an ionomer resin and an olefin elastomer.

6. The golf ball of claim 1 wherein said cover inner layer is composed primarily of a thermoplastic polyester elastomer.

7. The golf ball of claim 1 wherein said cover outer layer is made softer than said cover inner layer.

8. The golf ball of claim 1 further comprising an adhesive layer between said cover inner layer and said cover outer layer.

9. The golf ball of claim 8 wherein said adhesive layer is formed primarily of one of an urethane resin base adhesive and chlorinated polyolefin base adhesive to a thickness of 0.1 to 30 μm.

10. The golf ball of claim 1 having a plurality of dimples wherein the elevational cross-sectional shape of the dimple at its center has an area $S_1$, multiplying the dimple diameter by a dimple depth gives an area $S_2$, the average of the dimple cross-sectional shape area ratios represented by $S_1/S_2$ is from 0.58 to 0.68, and the total number of dimples is 360 to 540.

11. A multi-piece solid golf ball comprising a solid core and a cover which encloses the solid core and includes inner and outer layers, wherein said solid core has a deflection of at least 1.1 mm under an applied load of 30 kg, said cover inner layer has a Shore D hardness of 45 to 61, said cover outer layer has a Shore D hardness of 35 to 55, the sum of dimple trajectory volumes each obtained by multiplying a dimple volume by the square root of a dimple diameter is 530 to 750, said solid core has a specific gravity of 1.0 to 1.3, said cover inner layer has a specific gravity of 0.8 to 1.2, and said cover outer layer has a specific gravity of 0.9 to 1.3.

12. A multi-piece solid golf ball comprising a solid core and a cover which encloses the solid core and includes inner and outer layers, wherein said cover outer layer contains the reaction product of the thermoplastic polyurethane elastomer with an isocyanate compound as a main component, said solid core has a deflection of at least 1.1 mm under an applied load of 30 kg, said cover inner layer has a Shore D hardness of 45 to 61, said cover outer layer has a Shore D hardness of 35 to 55, and the sum of dimple trajectory volumes each obtained by multiplying a dimple volume by the square root of a dimple diameter is 530 to 750.

13. The golf ball of claim 12 wherein said cover inner and outer layers each are composed primarily of a thermoplastic resin.

14. The golf ball of claim 12 wherein said cover outer layer is composed primarily of a thermoplastic polyurethane elastomer prepared using an aliphatic diisocyanate.

15. The golf ball of claim 12 wherein said cover outer layer is composed primarily of an ionomer resin.

16. The golf ball of claim 12 wherein said cover inner layer is composed primarily of one of an ionomer resin and a resinous component consisting of an ionomer resin and an olefin elastomer.

17. The golf ball of claim 12 wherein said cover inner layer is composed primarily of a thermoplastic polyester elastomer.

18. The golf ball of claim 12 wherein said cover outer layer is made softer than said cover inner layer.

19. The golf ball of claim 12 further comprising an adhesive layer between said cover inner layer and said cover outer layer.

20. The golf ball of claim 19 wherein said adhesive layer is formed primarily of one of an urethane resin base adhesive and chlorinated polyolefin base adhesive to a thickness of 0.1 to 30 μm.

21. The golf ball of claim 12 having a plurality of dimples wherein the elevational cross-sectional shape of the dimple at its center has an area $S_1$, multiplying the dimple diameter by a dimple depth gives an area $S_2$, the average of the dimple cross-sectional shape area ratios represented by $S_1/S_2$ is from 0.58 to 0.68, and the total number of dimples is 360 to 540.

22. The golf ball of claim 12, wherein said isocyanate compound is selected from 2,4-toluene diisocyanate, 2,6-toluene diisocyanate and mixtures thereof, 4,4-diphenylmethane diisocyanate, m-phenylene diisocyanate, and 4,4'-biphenyl diisocyanate.

23. A multi-piece solid golf ball comprising a solid core and a cover which encloses the solid core and includes inner and outer layers, wherein said cover inner layer is composed primarily of one of an ionomer resin and a resinous component consisting of an ionomer resin and an olefin elastomer, said solid core has a deflection of at least 1.1 mm under an applied load of 30 kg, said cover inner layer has a Shore D hardness of 45 to 61, said cover outer layer has a Shore D hardness of 35 to 55, and the sum of dimple trajectory volumes each obtained by multiplying a dimple volume by the square root of a dimple diameter is 530 to 750.

24. The golf ball of claim 23 wherein said cover inner and outer layers each are composed primarily of a thermoplastic resin.

25. The golf ball of claim 23 wherein said cover outer layer is composed primarily of a thermoplastic polyurethane elastomer prepared using an aliphatic diisocyanate.

26. The golf ball of claim 23 wherein said cover outer layer is composed primarily of an ionomer resin.

27. The golf ball of claim 23 wherein said cover inner layer is composed primarily of a thermoplastic polyester elastomer.

28. The golf ball of claim 23 wherein said cover outer layer is made softer than said cover inner layer.

29. The golf ball of claim 23 further comprising an adhesive layer between said cover inner layer and said cover outer layer.

30. The golf ball of claim 29 wherein said adhesive layer is formed primarily of one of an urethane resin base adhesive and chlorinated polyolefin base adhesive to a thickness of 0.1 to 30 $\mu$m.

31. The golf ball of claim 23 having a plurality of dimples wherein the elevational cross-sectional shape of the dimple at its center has an area $S_1$, multiplying the dimple diameter by a dimple depth gives an area $S_2$, the average of the dimple cross-sectional shape area ratios represented by $S_1/S_2$ is from 0.58 to 0.68, and the total number of dimples is 360 to 540.

32. The golf ball of claim 23 wherein the olefin elastomer is selected from linear low density polyethylene, low density polyethylene, high density polyethylene, polypropylene, rubber-reinforced olefin polymers, flexomers, plastomers, styrene block copolymers, hydrogenated polybutadiene ethylene propylene rubber, dynamically vulcanized elastomers, ethylene acrylate, and ethylene vinyl acetate.

* * * * *